(12) United States Patent
Tsumiyama

(10) Patent No.: US 8,695,454 B2
(45) Date of Patent: *Apr. 15, 2014

(54) BICYCLE OPERATING DEVICE

(75) Inventor: Akira Tsumiyama, Osaka (JP)

(73) Assignee: Shimano Inc., Osaka (JP)

( * ) Notice: Subject to any disclaimer, the term of this patent is extended or adjusted under 35 U.S.C. 154(b) by 32 days.

This patent is subject to a terminal disclaimer.

(21) Appl. No.: 13/088,769

(22) Filed: Apr. 18, 2011

(65) Prior Publication Data

US 2011/0192249 A1   Aug. 11, 2011

Related U.S. Application Data

(62) Division of application No. 12/330,786, filed on Dec. 9, 2008, now Pat. No. 8,201,476.

(51) Int. Cl.
 *B62M 25/04* (2006.01)
 *F16C 1/10* (2006.01)

(52) U.S. Cl.
 USPC ............................ 74/551.8; 74/489; 74/502.2

(58) Field of Classification Search
 USPC ............... 74/502.2, 488, 489, 473.14, 473.15
 IPC .......................... F16C 1/10; B62M 25/00,25/04
 See application file for complete search history.

(56) References Cited

U.S. PATENT DOCUMENTS

| 4,974,469 | A | 12/1990 | Romano |
| 5,701,786 | A | 12/1997 | Kawakami |
| D392,233 | S | 3/1998 | Masui |
| 6,305,237 | B1 | 10/2001 | Ichida |
| 2006/0053940 | A1 | 3/2006 | Mclaughlin et al. |
| 2007/0137385 | A1 | 6/2007 | Cesur et al. |
| 2007/0151395 | A1 | 7/2007 | Barnett |
| 2007/0199401 | A1* | 8/2007 | Kawakami et al. .......... 74/502.2 |
| 2008/0202277 | A1* | 8/2008 | Miki ........................... 74/502.2 |

FOREIGN PATENT DOCUMENTS

| EP | 1 046 385 A2 | 10/2000 |
| JP | 54-28851 U | 2/1979 |
| JP | 63-312291 A | 12/1988 |
| JP | 63-315390 A | 12/1988 |
| JP | 01-134591 U | 9/1989 |
| JP | 01-157091 U | 10/1989 |
| JP | 2000-225974 A | 8/2000 |

OTHER PUBLICATIONS

Shimano Inc.; The System Component Group for Recreational Cycling Exage; Sales manual' pp. 17-18; Model M450/M350.

* cited by examiner

*Primary Examiner* — Richard W. Ridley
*Assistant Examiner* — Daniel Yabut
(74) *Attorney, Agent, or Firm* — Global IP Counselors

(57) ABSTRACT

A bicycle operating device is provided with a first operating unit, a second operating unit and a connecting member. The first operating unit includes a clamp portion for attaching the bicycle operating device to a bicycle and a first operating member. The second operating unit includes a second operating member. The connecting member includes first and second attachment portions. The first attachment portion is detachably attached to the first operating unit by a first adjustable connection. The second attachment portion is detachably attached to the second operating unit by a second adjustable connection. The first adjustable connection changes a relative position of the connecting member with respect to the clamp portion in a first direction. The second adjustable connection changes a relative position of the connecting member with respect to the second operating unit in a second direction that is different from the first direction.

16 Claims, 16 Drawing Sheets

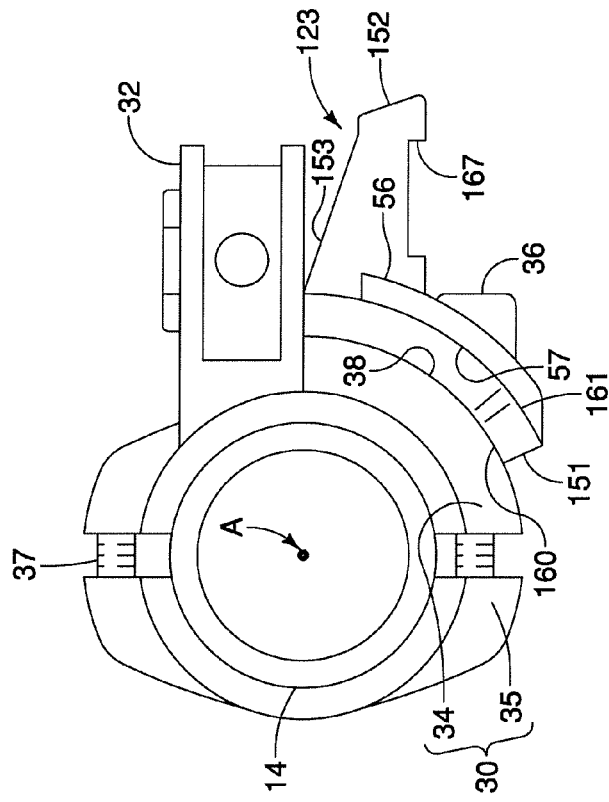
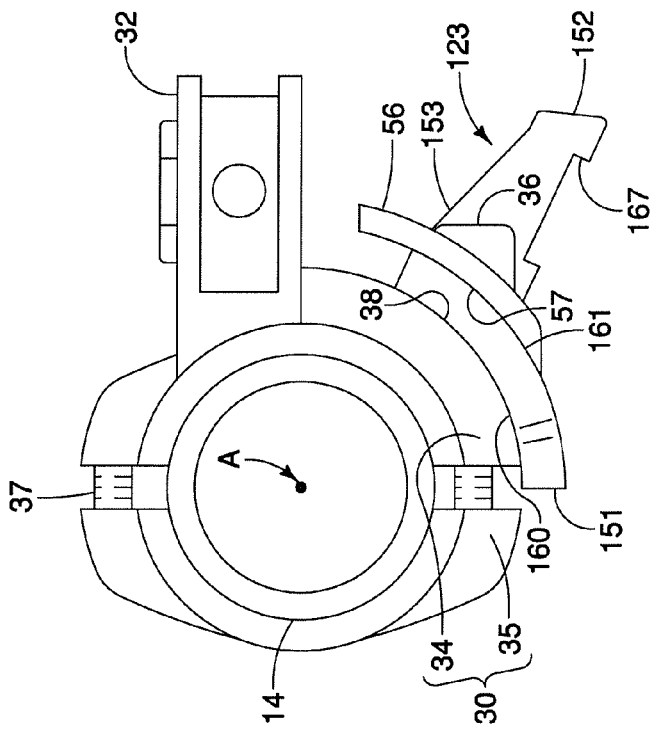

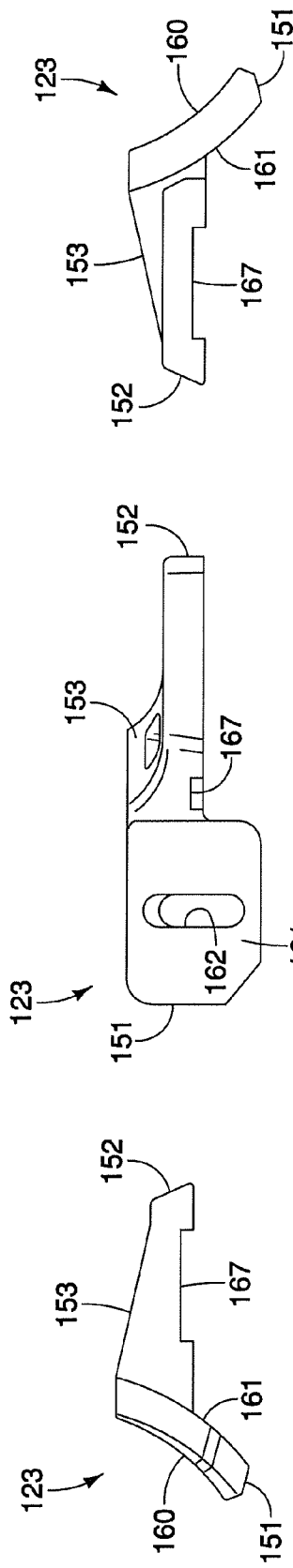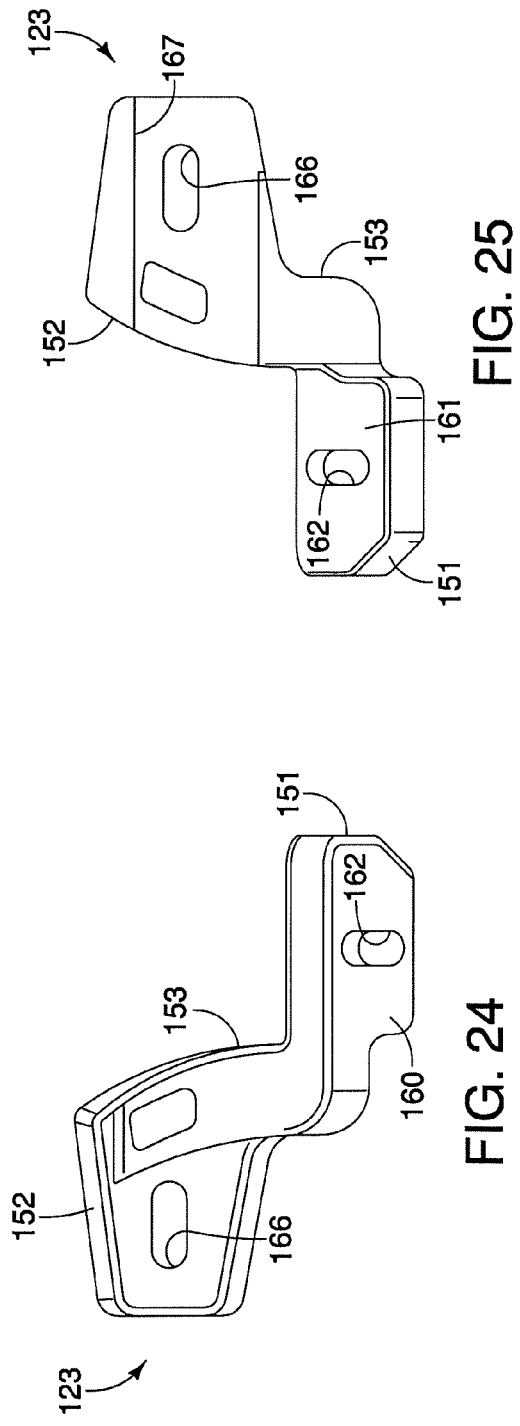

BICYCLE OPERATING DEVICE

CROSS-REFERENCE TO RELATED APPLICATIONS

This application is a divisional application of U.S. patent application Ser. No. 12/330,786, filed on Dec. 9, 2008. The entire disclosure of U.S. patent application Ser. No. 12/330, 786 is hereby incorporated herein by reference.

BACKGROUND OF THE INVENTION

1. Field of the Invention

This invention generally relates to a bicycle operating unit connector. More specifically, the present invention relates to a bicycle operating unit connector that connects a first operating unit to a second operating unit in an adjustable manner.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Bicycles are typically provided with a pair of brake levers for operating brake devices that apply braking forces to stop rotation of the wheels. These brake levers are typically mounted on the handlebar by a bracket having band clamp, with one being located adjacent each of the grips of the handlebar. A shifter or shift operating device is often mounted adjacent each of the brake levers. The shift operating device is made to shift the gears by operating an operating member in the form of a lever, for example. A conventional shift operating device has a bracket mounted on a handlebar, and a main shifter body mounted on the mounting bracket. In conventional practice, in cases in which a shift operating device is provided separately from a brake lever, normally, the shift operating device is attached to the handlebar inside the bracket of the brake lever. If the shift operating device is attached to the handlebar within the brake lever, then the shifter may be difficult to operate, depending on the shape(s) of the operating member(s) of the shift operating device.

Sometimes the brake lever and the shift operating device are integrated together as a single unit. Typically, the brake lever and the shift operating device are fixed relative to each other (See, for example, U.S. Pat. No. 5,701,786, assigned to Shimano Inc). However, combination brake/shift operating devices have been proposed in which the main shifter body is capable of moving in relation to the bracket (i.e., the attachment part) of the brake lever, such that the position of the main shifter body can be varied in an axial direction of the handlebar (See, for example, U.S. Pat. No. 4,974,469).

SUMMARY OF THE INVENTION

One object of the present invention is to provide a bicycle operating unit connector that connects a first operating unit to a second operating unit in an adjustable manner.

In accordance with one aspect of the present disclosure, a bicycle operating device is provided with a first operating unit, a second operating unit and a connecting member. The first operating unit includes a clamp portion for attaching the bicycle operating device to a bicycle and a first operating member. The second operating unit includes a housing and a second operating member. The connecting member includes a first attachment portion and a second attachment portion. The first attachment portion is detachably attached to an outwardly facing surface of the clamp portion of the first operating unit by a first adjustable connection. The second attachment portion is detachably attached to the second operating unit. The second attachment portion is detachably attached to the second operating unit by a second adjustable connection. The first adjustable connection is configured and arranged to change a relative position of the connecting member with respect to the clamp portion in a first direction. The second adjustable connection is configured and arranged to change a relative position of the connecting member with respect to the second operating unit in a second direction that is different from the first direction.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 18 is an end elevational view of the bicycle operating device illustrated in FIGS. 16 and 17, with the shift operating unit disposed in a first angular position around a center axis of the band part of the clamp portion;

FIG. 19 is an end elevational view of the bicycle operating device illustrated in FIGS. 16 to 18, with the shift operating unit disposed in a second angular position around a center axis of the band part of the clamp portion;

FIG. 21 is a left end elevational view of the connecting member for adjustably coupled to the shift operating unit to the brake operating unit in accordance with the second embodiment;

FIG. 22 is a front elevational view of the connecting member illustrated in FIG. 21;

FIG. 23 is a right end elevational view of the connecting member illustrated in FIGS. 21 and 22;

FIG. 24 is a top plan view of the connecting member illustrated in FIGS. 21 to 23; and FIG. 25 is a bottom plan view of the connecting member illustrated in FIGS. 21 to 24.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
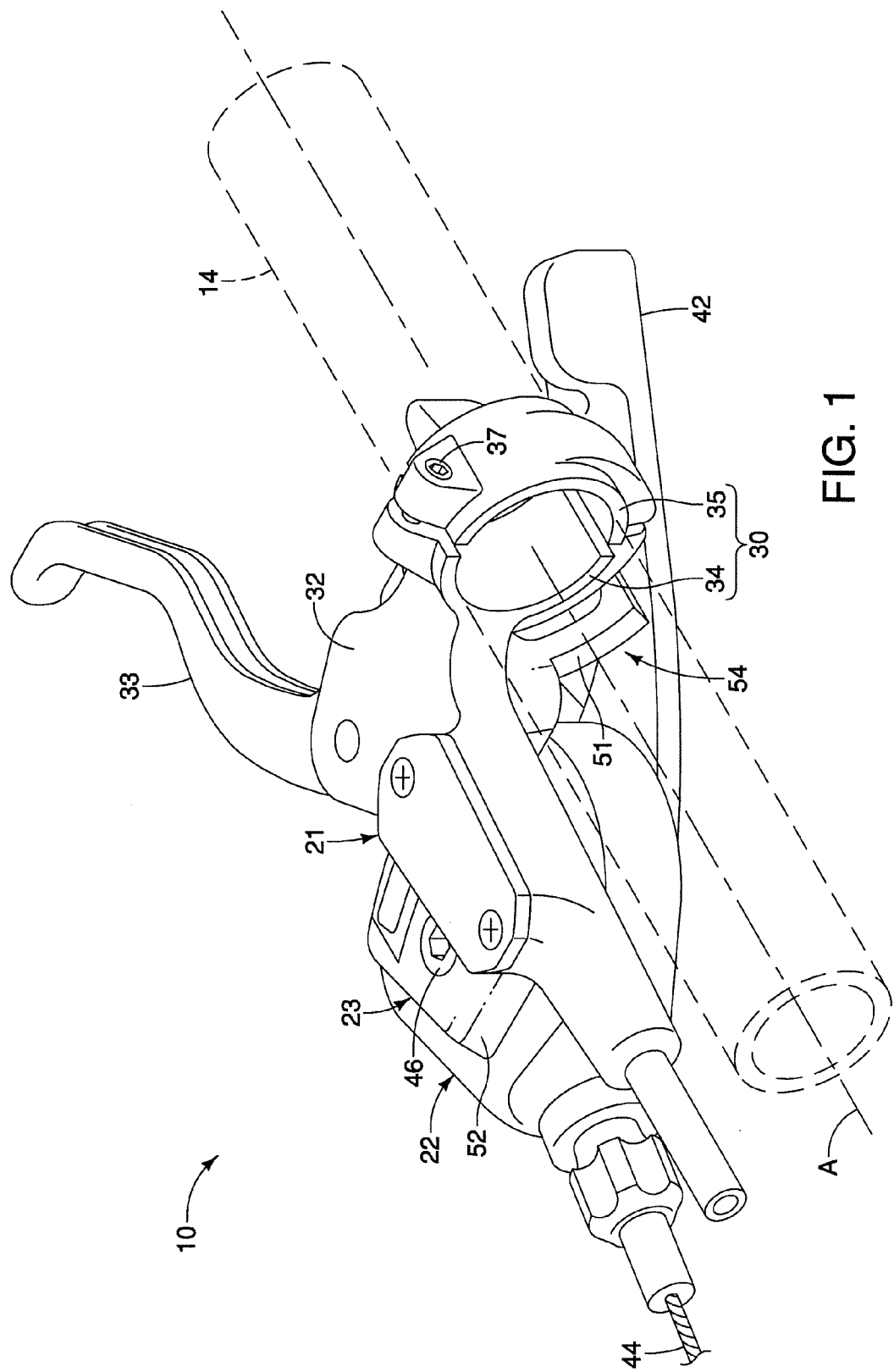
FIG. 1 is a top perspective view of a bicycle operating device attached to a handlebar with the bicycle operating device including a brake operating unit and a shift operating unit adjustably coupled to the brake operating unit by a connecting member in accordance with a first embodiment.
Figure 2:
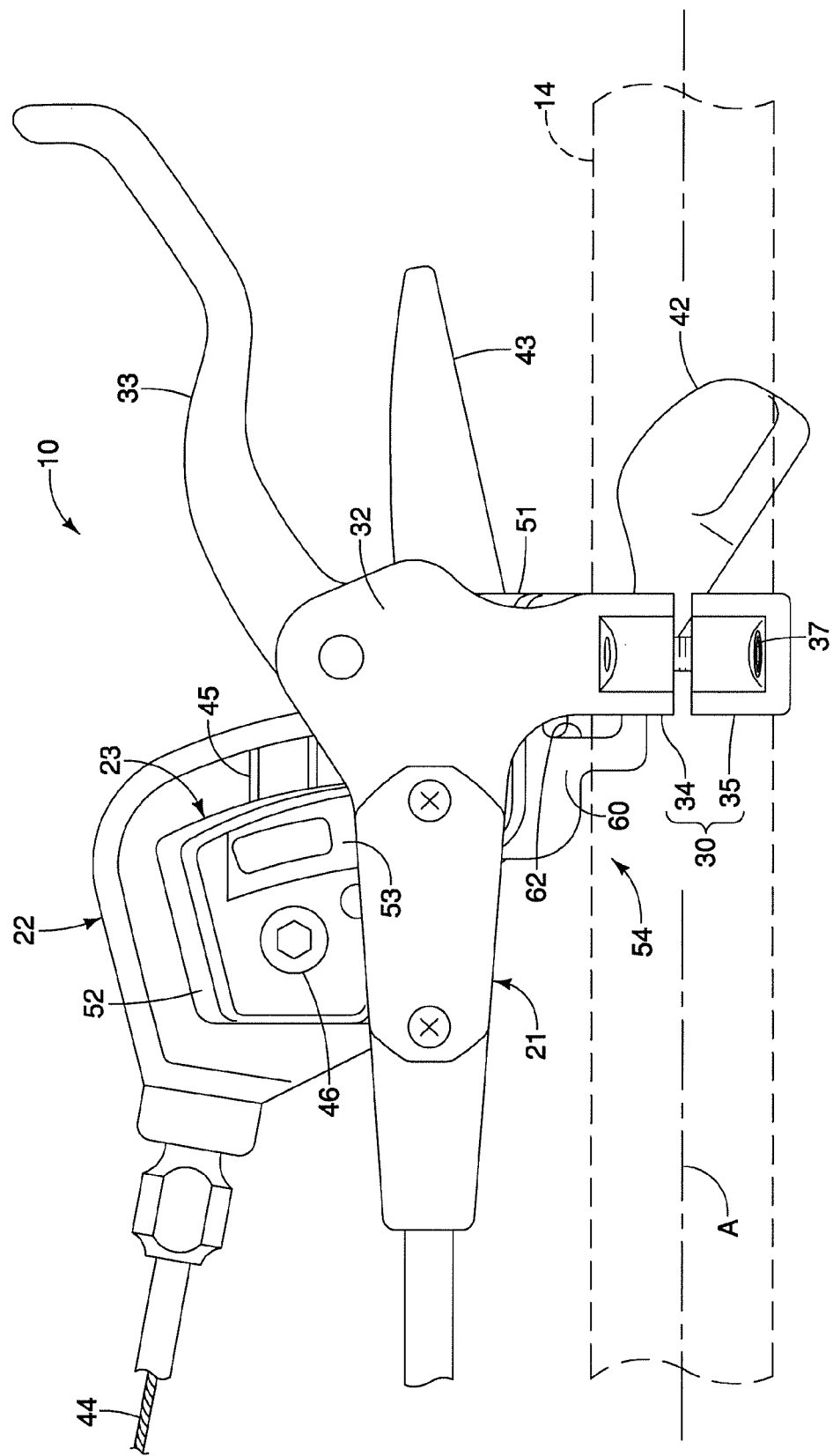
FIG. 2 is a top plan view of the bicycle operating device illustrated in FIG. 1, with the shift operating unit disposed in a first linear position with respect to the clamp portion.

Referring initially to FIG. 1, a bicycle operating device 10 is illustrated in accordance with a first embodiment. The bicycle operating device 10 is configured and arranged to be mounted on an end of a handlebar 14. Basically, the bicycle operating device 10 is provided with a first operating unit 21, a second operating unit 22 and a connecting member 23 that adjustably mounts the second operating unit 22 on the first operating unit 21, as discussed below. In the illustrated embodiment, the first operating unit 21 is a hydraulic brake operating unit, and the second operating unit 22 is a cable operated shift operating unit. Of course, it will be apparent to those skilled in the art from this disclosure that the first operating unit 21 can be a cable operated brake operating unit or any other type of brake operating unit, as needed and/or desired. Likewise, it will be apparent to those skilled in the art from this disclosure that the second operating unit 22 can be any type of shift operating unit, as needed and/or desired. In view of the conventional nature of the first and second operating units 21 and 22, the first and second operating units 21 and 22 will not be discussed and/or illustrated, except to the extent that they are configured to carry other the present invention.

Generally, the first operating unit 21 includes a clamp portion 30, a bracket portion 32 and a lever or first operating member 33. The lever 33 is pivotally mounted to the bracket portion 32. Operation of the lever 33 causes an increase in fluid pressure to operate a brake device (not shown) in a conventional manner. The clamp portion 30 has a first band part 34 and a second band part 35. The first and second band parts 34 and 35 are connected together by a pair of threaded fasteners or screws 36 and 37. The screw 36 is also used to secure the connecting member 23 to the first band part 34 of the clamp portion 30.

In the illustrated embodiment, the first band part 34 is integrally formed with the bracket portion 32. Thus, the first band part 34 has a non-threaded hole 34a for receiving the screw 36 and a threaded hole 34b for threadedly receiving the screw 37. The second band part 35 has a threaded hole 35a for threadedly receiving the screw 36 and a non-threaded hole 35b for receiving the screw 37.

By tightening the screws 36 and 37, the first and second band parts 34 and 35 move towards each other to squeeze the handlebar 14. Thus, the first and second band parts 34 and 35 fixedly secure the first and second operating units 21 and 22 to the handlebar 14. Once the clamp portion 30 is non-movably secured to the handlebar 14, a center axis A of the handlebar 14 becomes coincident with a center axis of the clamp portion 30. Thus, the center axis A as shown in the drawings refers to both the center axis of the handlebar 14 and the center axis of the clamp portion 30.

Figure 6:
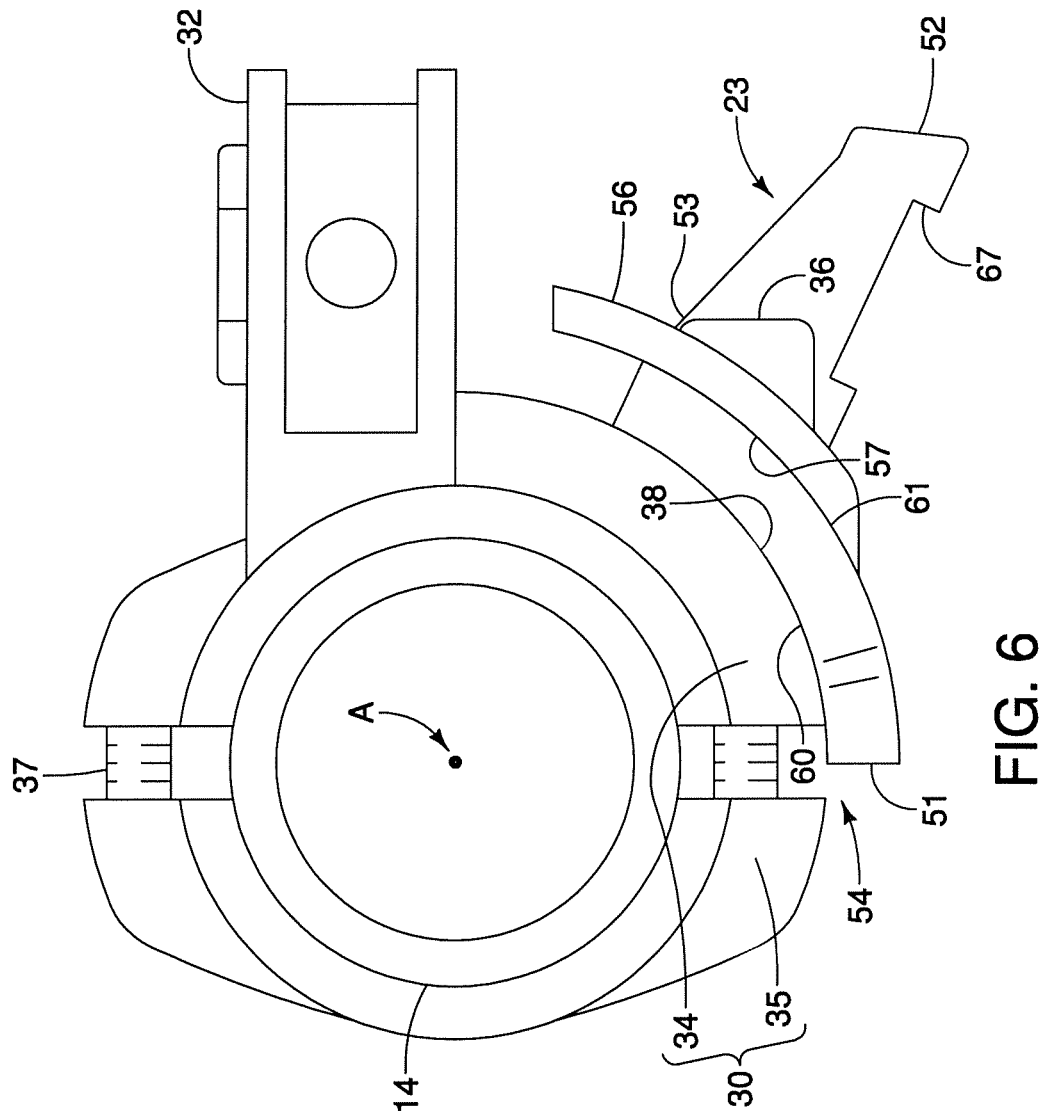
FIG. 6 is an end elevational view of the bicycle operating device illustrated in FIGS. 1 to 5, with the shift operating unit disposed in a first angular position around a center axis of the band part of the clamp portion as seen in FIGS. 1 to 5.
Figure 7:
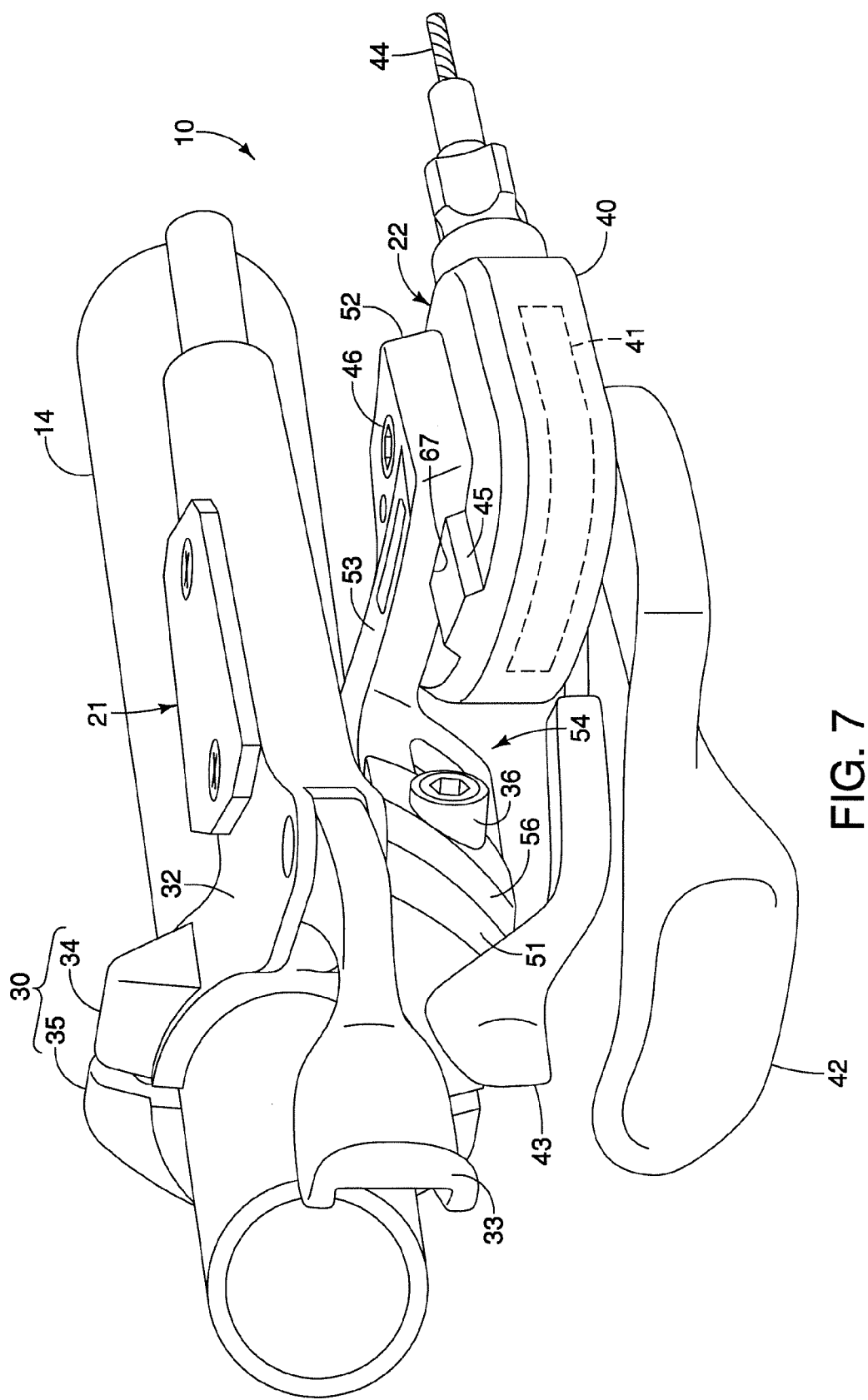
FIG. 7 is a front perspective view of the bicycle operating device illustrated in FIGS. 1 to 6, but with the shift operating unit disposed the first linear position and in a second angular position around a center axis of the band part of the clamp portion.
Figure 8:
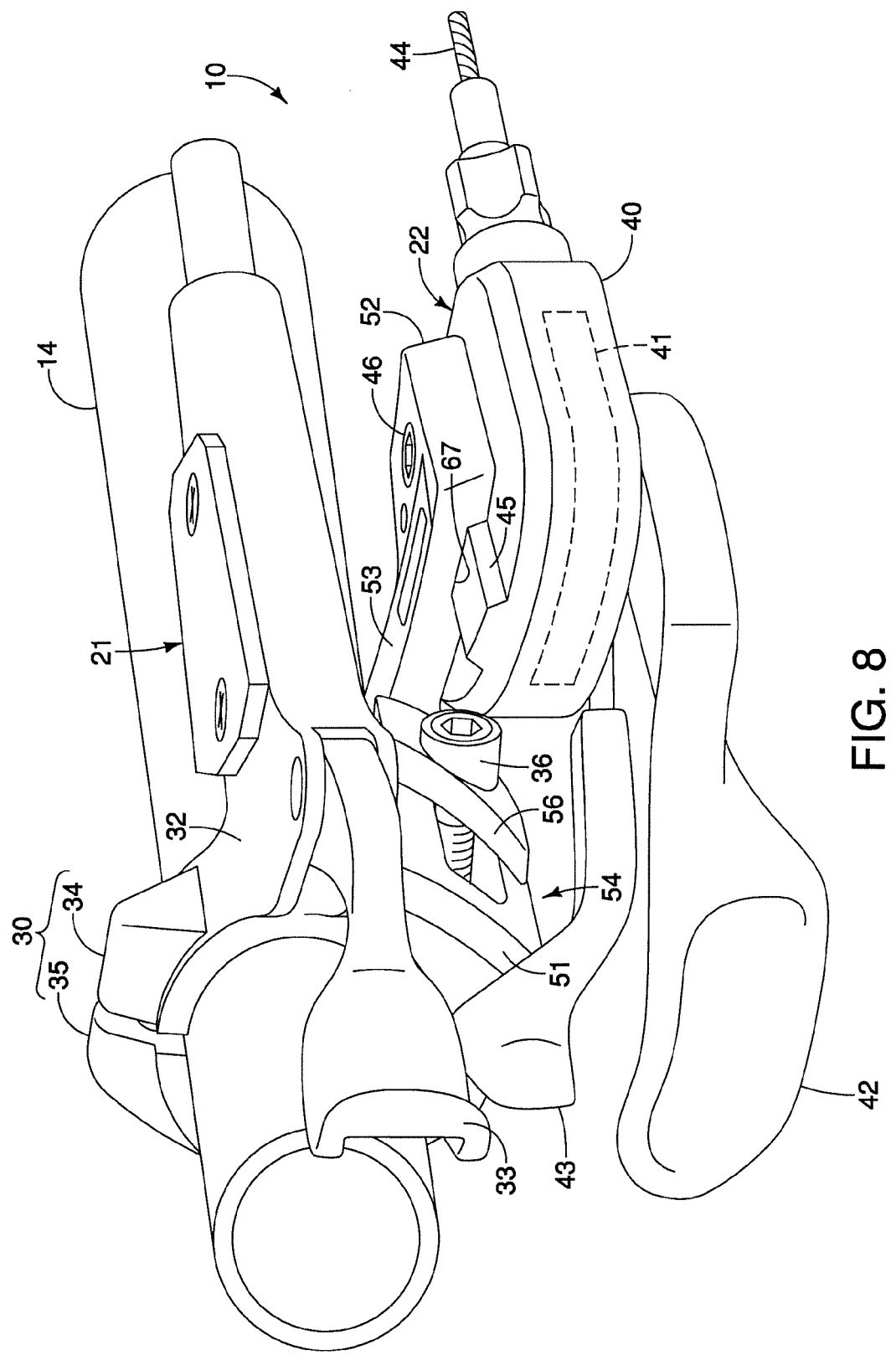
FIG. 8 is a front perspective view of the bicycle operating device illustrated in FIGS. 1 to 7, but with the shift operating unit disposed in the second linear position and the second angular position around a center axis of the band part of the clamp portion.
Figure 9:
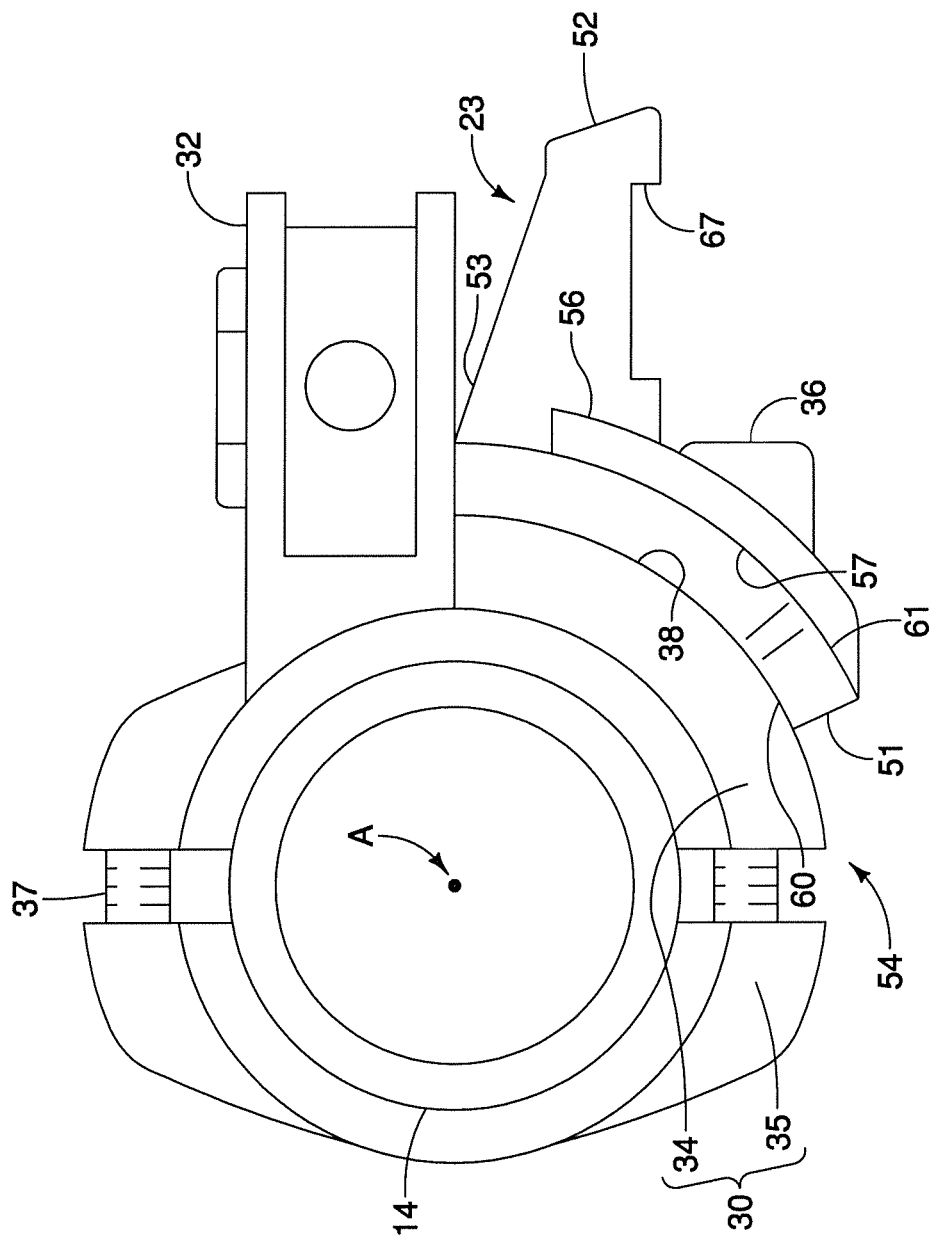
FIG. 9 is an end elevational view of the bicycle operating device illustrated in FIGS. 1 to 8, with the shift operating unit disposed in a second angular position around a center axis of the band part of the clamp portion as seen in FIGS. 7 and 8.
Figure 10:
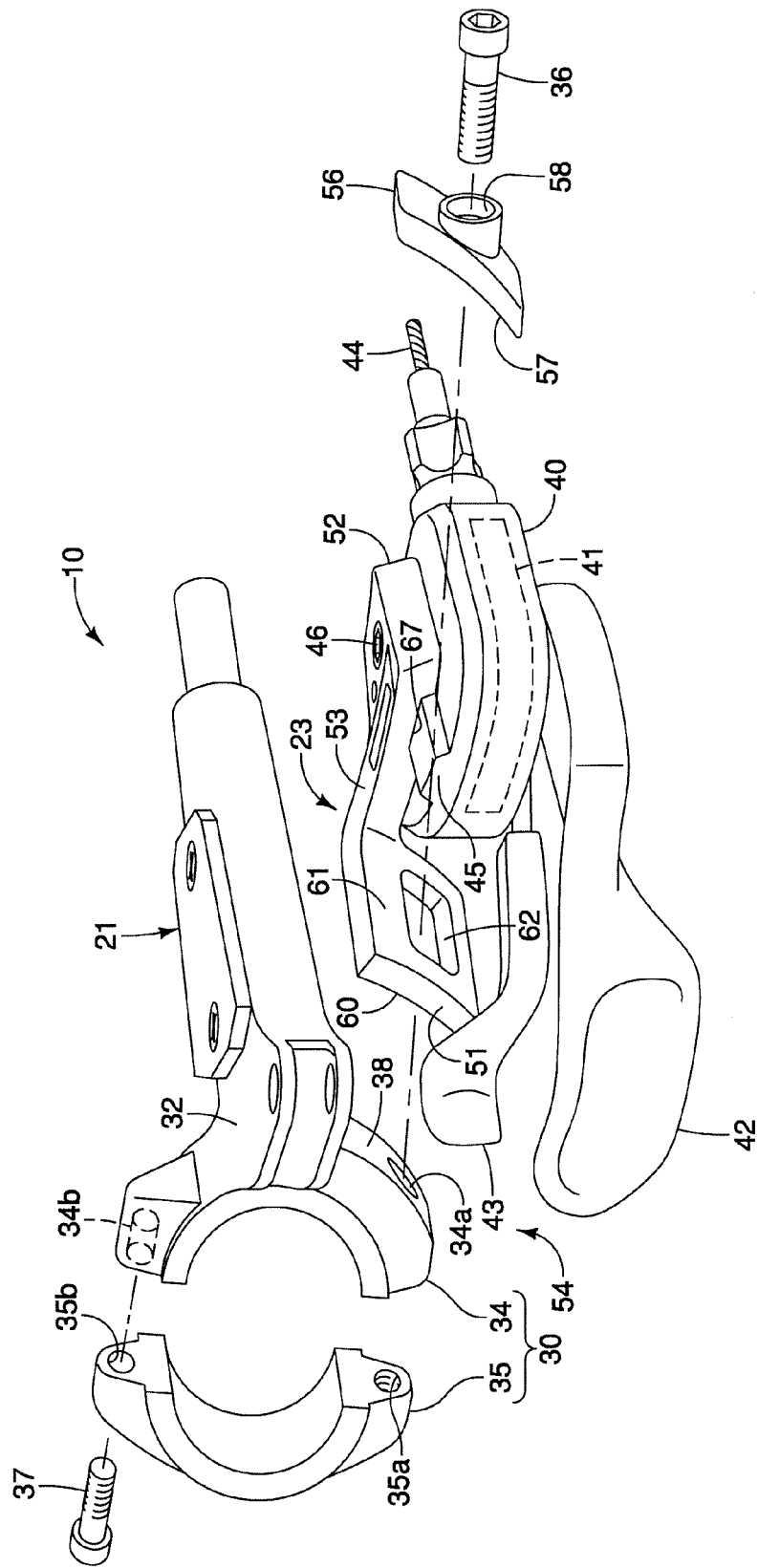
FIG. 10 is an exploded perspective view of the bicycle operating device illustrated in FIGS. 1 to 9.
Figure 11:
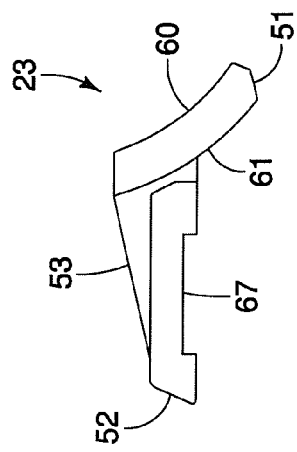
FIG. 11 is a left end elevational view of the connecting member for adjustably coupled to the shift operating unit to the brake operating unit in accordance with the first embodiment.
Figure 12:
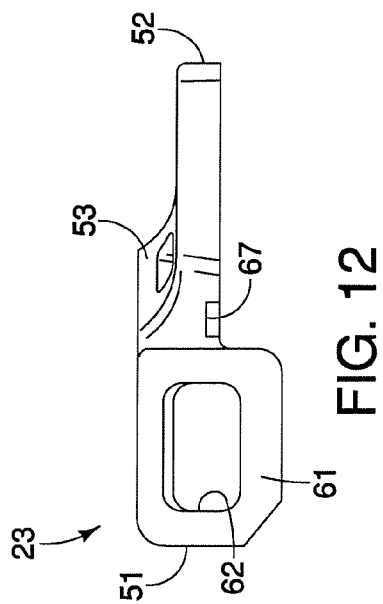
FIG. 12 is a front elevational view of the connecting member illustrated in FIG. 11.
Figure 13:
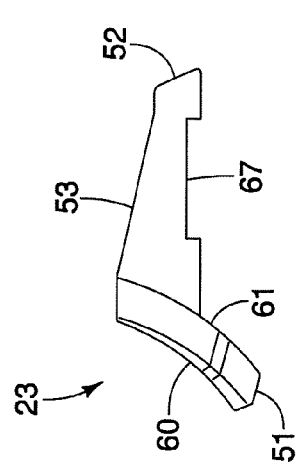
FIG. 13 is a right end elevational view of the connecting member illustrated in FIGS. 11 and 12.
Figure 14:
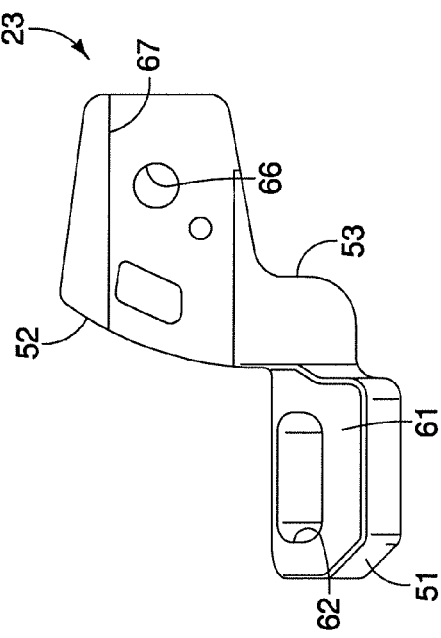
FIG. 14 is a top plan view of the connecting member illustrated in FIGS. 11 to 13.
Figure 15:
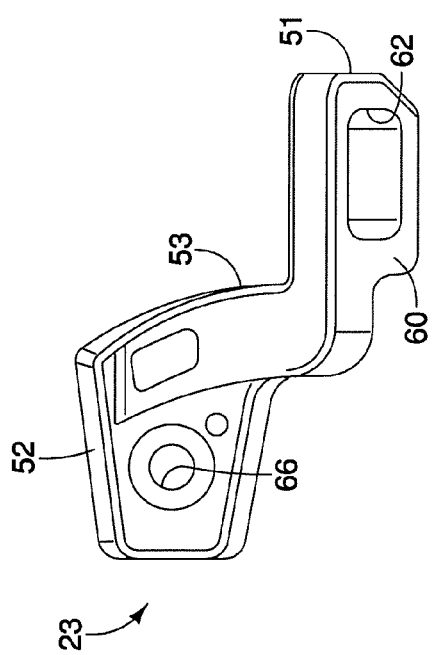
FIG. 15 is a bottom plan view of the connecting member illustrated in FIGS. 11 to 14.
Figure 16:
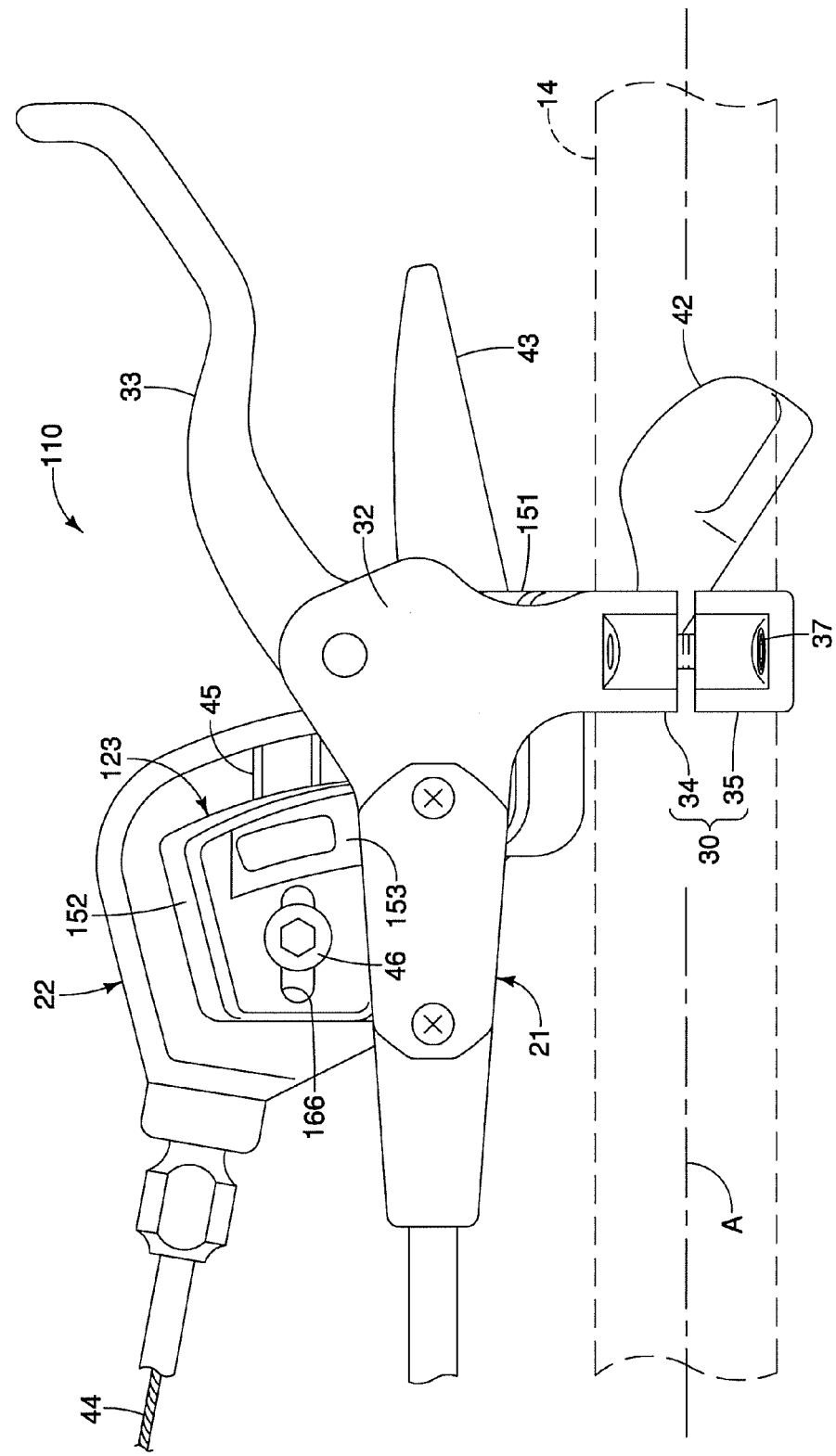
FIG. 16 is a top plan view of a bicycle operating device attached to a handlebar with the bicycle operating device including a brake operating unit and a shift operating unit adjustably coupled to the brake operating unit by a connecting member with the shift operating unit disposed in a first linear position with respect to the clamp portion in accordance with a second embodiment.
Figure 17:
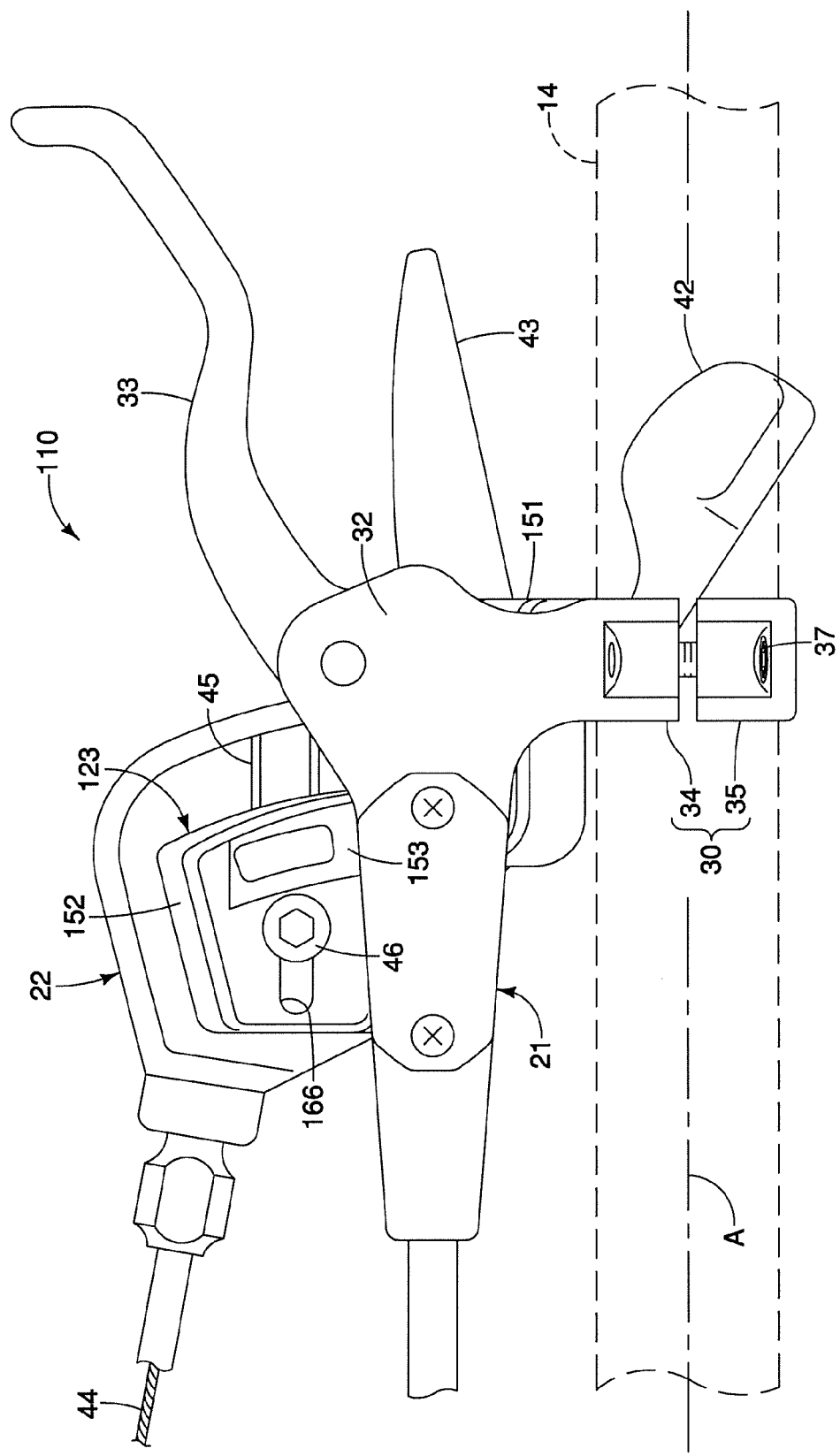
FIG. 17 is a top plan view, similar to FIG. 16, of the bicycle operating device with the shift operating unit disposed in a second linear position with respect to the clamp portion.
Figure 20:
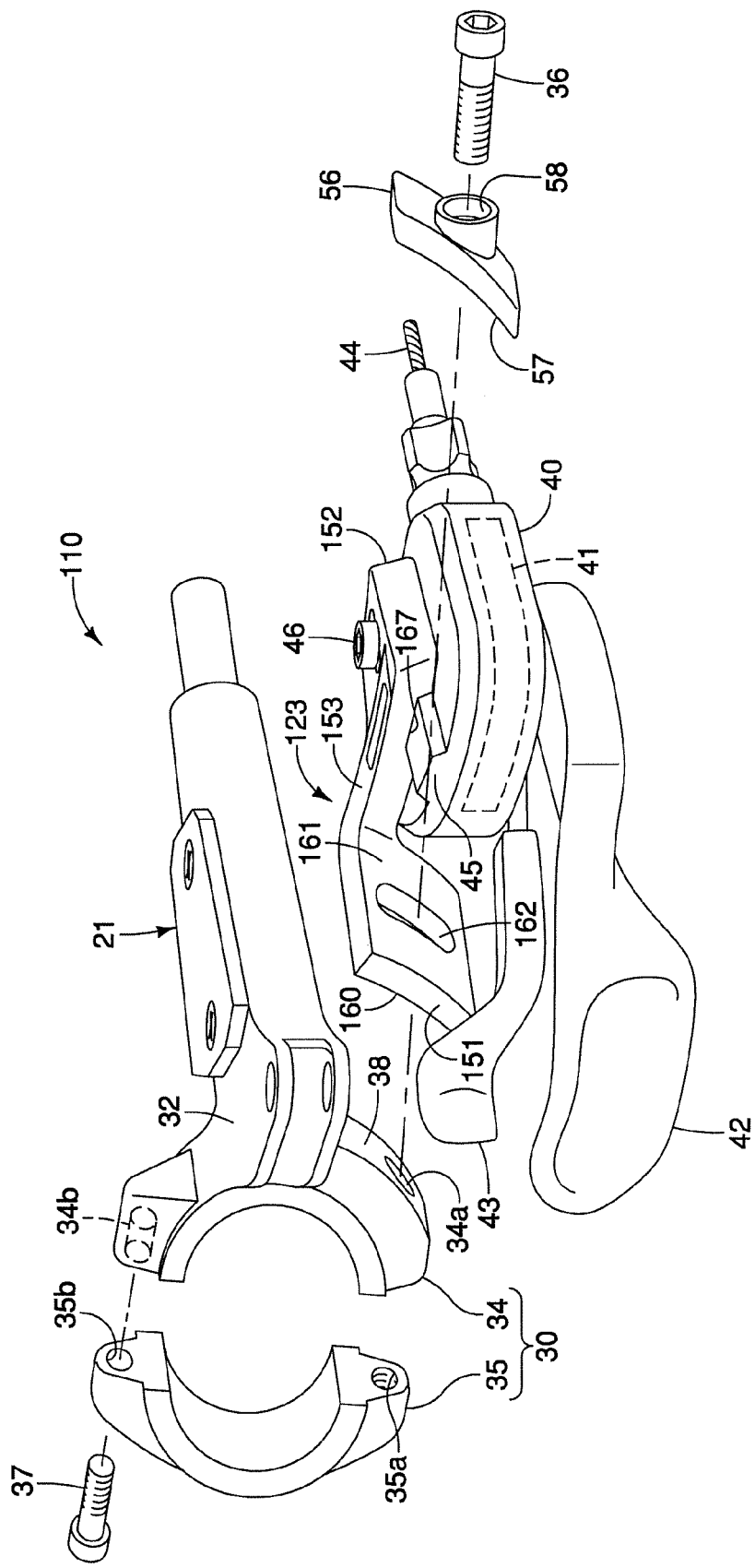
FIG. 20 is an exploded perspective view of the bicycle operating device illustrated in FIGS. 16 to 19.

As best seen in FIG. 10, the first band part 34 of the clamp portion 30 has an outwardly facing surface 38. The outwardly facing surface 38 of the first band part 34 of the clamp portion 30 is convexly curved about the center axis A or an axis that is parallel to the center axis A. Alternatively, the outwardly facing surface 38 of the first band part 34 of the clamp portion 30 can be convexly curved about an axis that is non-parallel to the center axis A. In any case, the outwardly facing surface 38 of the first band part 34 cooperates with the connecting member 23 to provide for adjustment of the connecting member 23 in an angular direction with respect to the clamp portion 30. In this way, the connecting member 23 can be secured in a plurality of angular orientations (e.g., two of the angular orientations are best seen in FIGS. 6 and 9).

Generally, as seen in FIG. 10, the second operating unit 22 includes a housing 40, a cable winding unit 41 disposed inside the housing 40 and a pair of operating member 42 and 43 extending out of the housing 40. The operating member 42 and 43 are used to operate the cable winding unit 41 to pull and release an inner wire 44 that is attached to a wire takeup member of the cable winding unit 41. Shifters are well known in the bicycle field, and it will be apparent from this disclosure that the second operating unit 22 can be any type of shifter unit (e.g., a one lever shifter, a two lever shifter, etc.). In other words, the cable winding unit 41 can be any type of shifting unit. Thus, the cable winding unit 41 will not be described and/or illustrated in detail herein.

Figure 3:
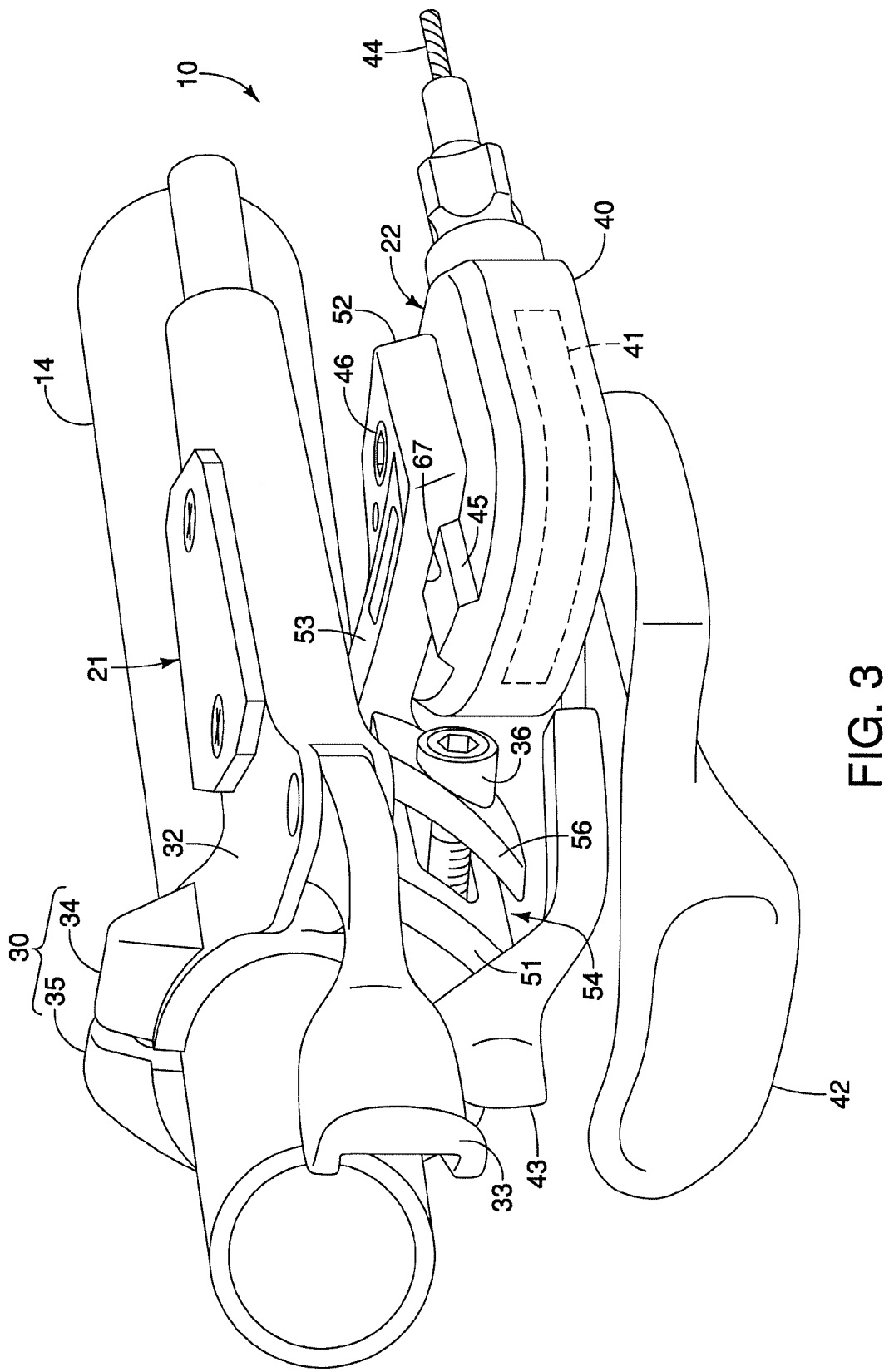
FIG. 3 is a front perspective view of the bicycle operating device illustrated in FIGS. 1 and 2, with the shift operating unit disposed in the first linear position as seen in FIG. 2.
Figure 4:
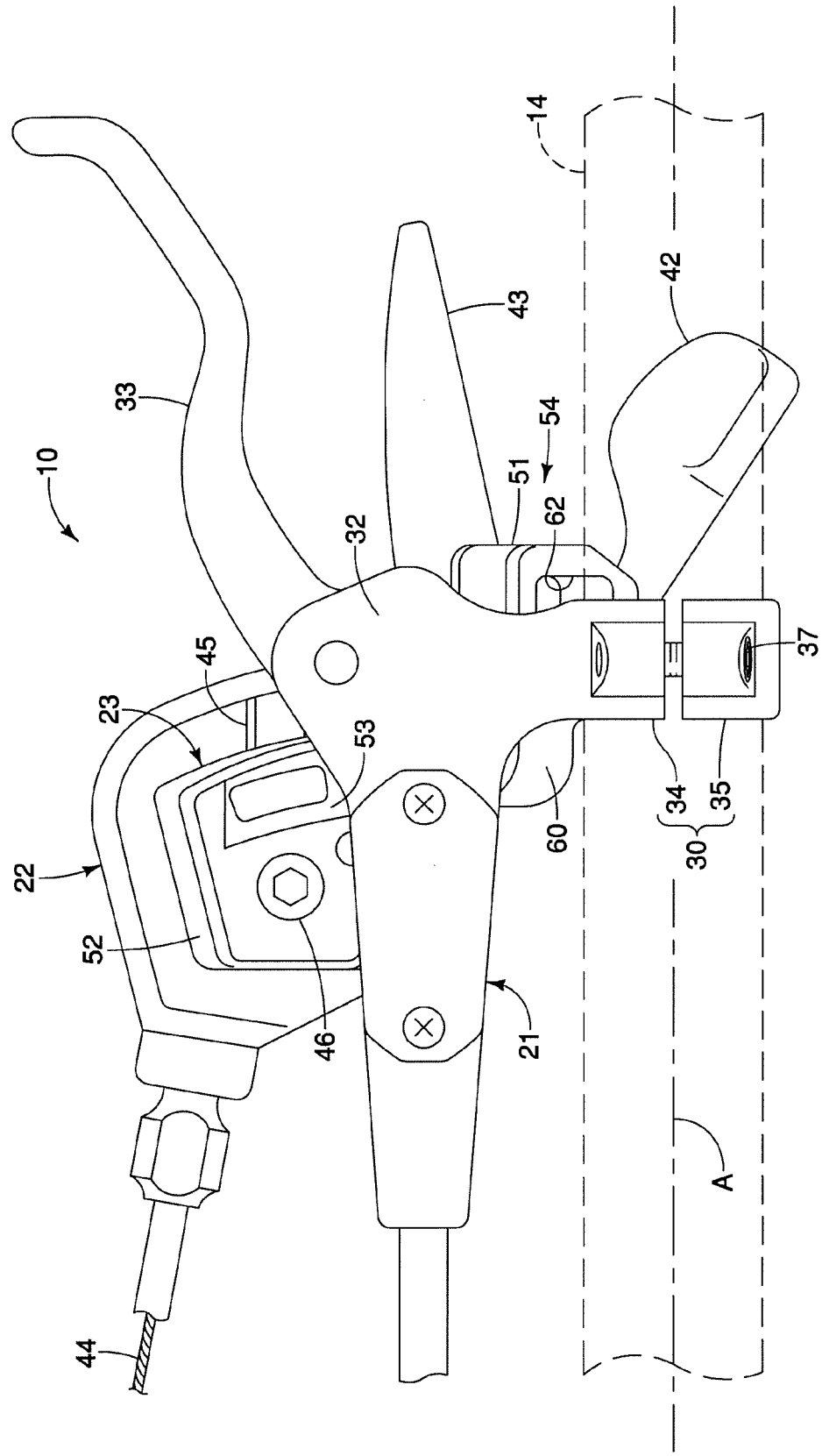
FIG. 4 is a top plan view of the bicycle operating device illustrated in FIG. 1, with the shift operating unit disposed in a second linear position with respect to the clamp portion.
Figure 5:
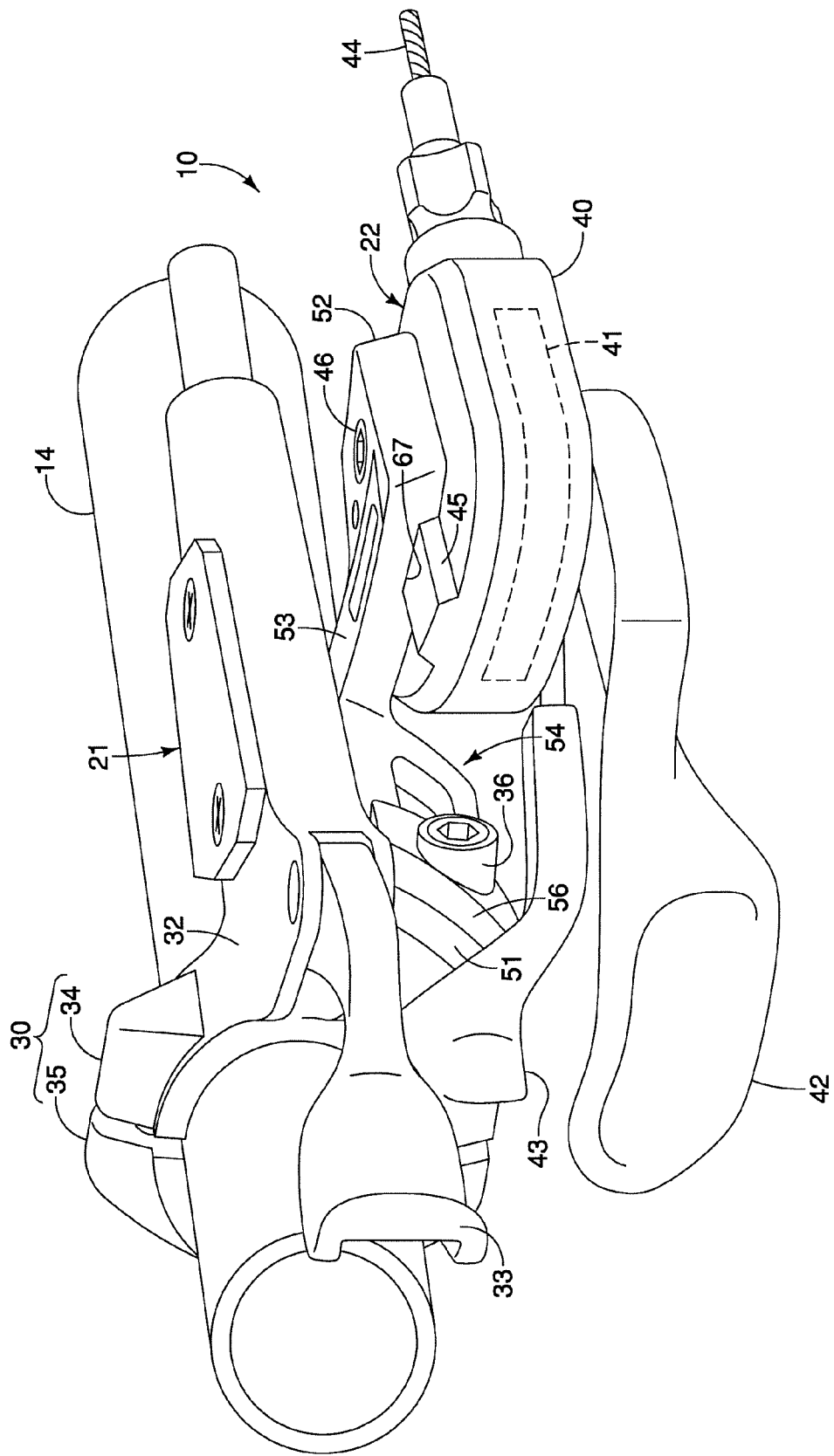
FIG. 5 is a front perspective view of the bicycle operating device illustrated in FIGS. 1 to 3, with the shift operating unit disposed in the second linear position as seen in FIG. 4.

As seen in FIGS. 2 to 5, the housing 40 has an upper surface with a protruding rib 45 that acts as a positioning member or an anti-rotation member. As seen in FIG. 3, the protruding rib 45 forms a one-piece unitary structure with the housing 40. The protruding rib 45 is disposed on the housing 40 at a location spaced from the connecting member 23 with respect to the linear direction in at least one attachment position of the second attachment portion 52. In particular, the connecting member 23 is attached to the housing 40 by a threaded fastener or screw 46 that engages a threaded hole of the second operating unit 22. The protruding rib 45 extends in the linear direction. The protruding rib 45 engages the connecting member 23 to prevent relative rotation of the second operating unit 22 with respect to the connecting member 23 about the axis of the screw 46. As understood from FIG. 5, the protruding rib 45 extends in the linear direction for a greater distance than the screw 16 extends in the linear direction.

Referring now to FIGS. 10 to 15, the connecting member 23 will be discussed in more detail. Basically, the connecting member 23 is an attachment member (adapter) for attaching the second operating (shift lever) unit 22 to the first operating (brake lever) unit 21. This connecting member 23 can provide an adjustment function of the second operating (shift lever) unit 22 with respect to the first operating (brake lever) unit 21 in two different directions. In this embodiment, one direction is in parallel with handlebar, and the other direction is around the brake band, but the present invention is not limited to these two specific directions.

In this illustrated embodiment, the connecting member 23 is configured and arranged to change a relative position of the second operating unit 22 with respect to the first operating unit 21 or the handlebar 14. Specifically, the relative position of the second operating unit 22 with respect to the first operating unit 21 or the handlebar 14 can be changed both in a linear direction and an angular direction with respect to the center axis A of the handlebar 14 and the clamp portion 30. In other words, the linear location and the angular orientation of the second operating unit 22 are both independently adjustable with respect to the center axis A of the handlebar 14 where the first operating unit 21 is fixed to the handlebar 14. As used herein, the phrase "linear direction with respect to a center axis" does not require the linear direction to be parallel with respect to the center axis, but rather the linear direction can include both an angular component of movement and a linear component of movement with respect to the center axis as some other component of movement. Also as used herein, the phrase "angular direction relative to a center axis" does not require the angular direction to concentric with the center axis, but rather the angular direction can include movement that are not concentric with the center axis.

The connecting member 23 is preferably a one-piece, unitary member that is constructed of a hard rigid material such a rigid metal or a rigid plastic material. The connecting member 23 basically includes a first attachment portion 51, a second attachment portion 52 and an intermediate portion 53 interconnecting the first and second attachment portions 51 and 52. The first attachment portion 51 is detachably attached to the outwardly facing surface 38 of the first band part 34 of the clamp portion 30 by an adjustable connection 54 that is adjustable to change a relative position of the connecting member 23 with respect to the clamp portion 30. The second attachment portion 52 is detachably attached to the second operating unit 22 by the fastener or screw 46.

The adjustable connection 54 between the first attachment portion 51 of the connecting member 23 and the first band part 34 of the clamp portion 30 provides relative movement of the connecting member 23 with respect to the clamp portion 30 in both the linear direction and the angular direction with respect to the center axis A of the band part (e.g., the first band part 34 and the second band part 35) of the clamp portion 30. Basically, the adjustable connection 54 is formed by the fastener or screw 36, the threaded hole 35*b* of the second band part 35, the outwardly facing surface 38 of the first band part 34.

The first attachment portion 51 is configured to be detachably attached to the outwardly facing surface 38 of the first band part 34 of the clamp portion 30 by the fastener or screw 36. Preferably, a washer 56 is provided between the head of the screw 36 and the first attachment portion 51. The washer 56 has a concaved engagement surface 57 that contacts the first attachment portion 51 and a hole 58 for receiving the screw 36.

The first attachment portion 51 includes a curved mounting surface 60, a curved engagement surface 61 and an adjustment opening 62 that extends between the curved mounting surface 60 and the curved engagement surface 61. The curved mounting surface 60 engages or mates with the outwardly facing surface 38 of the first band part 34 of the clamp portion 30 such that the outwardly facing surface 38 and the curved mounting surface 60 cooperate together to form at least part of the adjustable connection 54. The curved engagement surface 61 engages or mates with the concaved engagement surface 57 of the washer 56.

The adjustment opening 62 and the fastener or screw 36 are dimensioned with the fastener or screw 36 having its shaft disposed in the adjustment opening 62 when the connecting member 23 is fastened to the band part (i.e., the first and second band parts 34 and 35) of the clamp portion 30. The dimension of the adjustment opening 62 with respect to the dimension (i.e., the diameter or width) of the shaft of the screw 36 disposed in the adjustment opening 62 determines the range of adjustment of the connecting member 23 with respect to the band part (i.e., the first and second band parts 34 and 35) of the clamp portion 30. Also when the connecting member 23 is fastened to the band part (i.e., the first and second band parts 34 and 35) of the clamp portion 30, the hole 34*a* non-threadedly receives a portion of the shaft of the fastener or screw 36 therethrough, while the hole 35*a* threadedly receives a threaded portion of the shaft of the fastener or screw 36 therein.

Thus, when the screw 36 is loosened, the connecting member 23 can be adjusted by the surfaces 60 and 61 sliding between the surfaces 38 and 57 such that the fastener or screw 36, the adjustment opening 62 and the threaded hole 35*b* cooperate together to further form at least part of the adjustable connection 54. In particular, the adjustment opening 62 is a generally rectangular opening that has a width and a length that is larger than a diameter of the screw 36 that extends through the adjustment opening 62 so that the position of the connecting member 23 can be independently adjusted with respect to the first band part 34 of the clamp portion 30 in both the linear direction and the angular direction as mentioned above. In this way, the relative position of the second operating unit 22 with respect to the first operating unit 21 or the handlebar 14 can be changed both in the linear direction and the angular direction with respect to the center axis A of the handlebar 14 and the clamp portion 30.

The second attachment portion 52 extends transversely from the first attachment portion 51 via the intermediate portion 53. The second attachment portion 52 is configured to be detachably attached to the second operating unit 22 by the fastener or screw 46. The second attachment portion 52 includes a circular mounting hole 66 that receives the screw 46 to fixedly secure the second attachment portion 52 to the second operating unit 22. The lower surface of the second attachment portion 52 has a recess 67 that receives the protruding rib 45 of the housing 40 of the second operating unit 22 to prevent relative rotation therebetween.

SECOND EMBODIMENT

Referring now to FIGS. 16 to 25, a bicycle operating device 110 in accordance with a second embodiment will now be explained. Basically, the only difference between the bicycle operating device 10 and the bicycle operating device 110 is that the bicycle operating device 110 uses a modified connecting member 123. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the connecting member 123 is configured and arranged to change a relative position of the second operating unit 22 with respect to the first operating unit 21 or the handlebar 14 in both the linear direction and the angular direction with respect to the center axis A of the handlebar 14 and the clamp portion 30. The connecting member 123 is preferably a one-piece, unitary member that is constructed of a hard rigid material such a rigid metal or a rigid plastic material. The connecting member 123 basically includes a first attachment portion 151, a second attachment portion 152 and an intermediate portion 153 interconnecting the first and second attachment portions 151 and 152. The first attachment portion 151 is detachably attached to the outwardly facing surface 38 of the first band part 34 of the clamp portion 30 to change a relative position of the second operating unit 22 with respect to the clamp portion 30. The second attachment portion 152 is detachably attached to the second operating unit 22 by the fastener or screw 46.

The first attachment portion 151 is configured to be detachably attached to the outwardly facing surface 38 of the first band part 34 of the clamp portion 30 by the fastener or screw 36. The washer 56 is provided between the head of the screw 36 and the first attachment portion 151. The first attachment portion 151 includes a curved mounting surface 160, a curved engagement surface 161 and an adjustment opening 162 that extends between the curved mounting surface 160 and the curved engagement surface 161. In this embodiment, the adjustment opening 162 is an elongated slot that is arranged to provide adjustment of the second operating unit 22 in the angular direction with respect to the center axis A.

When the connecting member 123 is attached to the clamp portion 30 by the screw 36, the curved mounting surface 160 engages or mates with the outwardly facing surface 38 of the first band part 34 of the clamp portion 30 such that the outwardly facing surface 38 and the curved mounting surface 160 cooperate together. The curved engagement surface 161 engages or mates with the concaved engagement surface 157 of the washer 156. When the screw 36 is loosened, the connecting member 123 can be adjusted in the angular direction by the surfaces 160 and 161 sliding between the surfaces 38 and 57.

The second attachment portion 152 extends transversely from the first attachment portion 151 via the intermediate portion 153. The second attachment portion 152 is configured to be detachably attached to the second operating unit 22 by the fastener or screw 46. The second attachment portion 152 includes an elongated mounting hole 166 that receives the screw 46 to fixedly secure the second attachment portion 52 to the second operating unit 22. The lower surface of the second attachment portion 152 has a recess 167 that receives the protruding rib 45 of the housing 40 of the second operating unit 22 to prevent relative rotation therebetween. Thus, the recess 167 opens to the lower surface of the second attachment portion 152 and also opens to the side surfaces of the second attachment portion 152 which are shown in FIGS. 21 and 23. In other words, the recess 167 opens to three distinct surfaces of the second attachment member 152. As seen in FIG. 25, the elongated mounting hole 166 extends toward the lower surface of the second attachment portion 152 so as to intersect with the recess 167.

The elongated mounting hole 166 is arranged for adjusting the position of the second operating unit 22 in the linear direction with respect to the center axis A. In other words, the elongated mounting hole 166 is a slot that is arranged in a linear direction parallel to the center axis A. When the screw 46 is loosened, the second operating unit 22 can be moved relative to the connecting member 123 in the linear direction with respect to the center axis A. The elongated mounting hole or slot 166 is transversely arranged with respect to the adjustment opening or slot 162. Although slots 162 and 166 are used, two separate holes can be provided instead of elongated slots 162 and 166, respectively.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle operating device described herein. Accordingly, these terms, as utilized to describe the present invention should be interpreted relative to a bicycle equipped with the bicycle operating device described herein as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
a first operating unit including a clamp portion for attaching the bicycle operating device to a bicycle and a first operating member;
a second operating unit including a housing and a second operating member; and
a connecting member including a first attachment portion and a second attachment portion, the first attachment portion being detachably attached to an outwardly facing surface of the clamp portion of the first operating unit by a first adjustable connection, and the second attachment portion being detachably attached to the second operating unit by a second adjustable connection,
the first adjustable connection being configured and arranged to change a relative position of the connecting member with respect to the clamp portion in a first direction, the first adjustable connection providing angular adjustment in the first direction with respect to a center axis of a band part of the clamp portion,
the second adjustable connection being configured and arranged to change a relative position of the connecting member with respect to the second operating unit in a second direction that is different from the first direction,
the second attachment portion further including a recess receiving a protruding rib provided on the second operating unit and extending in the second direction to provide linear adjustment in the second direction with respect to the center axis of the band part of the clamp portion, the protruding rib forming a one-piece unitary structure with the second operating unit, the second attachment portion of the connecting member further including a fastener attached to the second operating unit, the fastener intersecting with the recess of the second attachment portion.

2. The bicycle operating device according to claim 1, wherein
the first operating unit is a brake operating unit, and the second operating unit is a shift operating unit.

3. The bicycle operating device according to claim 1, wherein
the outwardly facing surface is formed on the band part of the clamp portion of the first operating unit.

4. The bicycle operating device according to claim 1, wherein
the outwardly facing surface is formed on the band part of the clamp portion and is curved, and the first attachment portion of the connecting member has a curved mounting surface that mates with the outwardly facing surface of the band part of the clamp portion such that the outwardly facing surface and the curved mounting surface cooperate together to form at least part of the first adjustable connection.

5. The bicycle operating device according to claim 4, wherein
the first attachment portion of the connecting member includes an opening in the curved mounting surface with a fastener having a shaft disposed in the opening, and the band part of the clamp portion includes a hole that receives the shaft of the fastener such that the fastener, the opening and the hole cooperate together to further form at least part of the first adjustable connection.

6. The bicycle operating device according to claim 3, wherein
the first adjustable connection includes a fastener that attaches the first attachment portion of the connecting member to the band part of the clamp portion, and the fastener is further arranged to tighten the band part.

7. The bicycle operating device according to claim 1, wherein
the second attachment portion of the connecting member includes a slot arranged in a linear direction parallel to the center axis of the clamp portion, and the fastener has a shaft disposed in the slot and attached to the second operating unit, the slot and the fastener cooperating together to further form at least part of the second adjustable connection.

8. The bicycle operating device according to claim 3, wherein
the outwardly facing surface of the band part of the clamp portion is curved, and the first attachment portion of the connecting member has a curved mounting surface that mates with the outwardly facing surface of the band part of the clamp portion such that the outwardly facing surface and the curved mounting surface cooperate together to form at least part of the first adjustable connection.

9. The bicycle operating device according to claim 8, wherein
the first attachment portion of the connecting member includes an opening in the curved mounting surface with a first fastener having a shaft disposed in the opening, and the band part of the clamp portion includes a hole that receives the shaft of the first fastener such that the first fastener, the opening and the hole cooperate together to further form at least part of the first adjustable connection.

10. The bicycle operating device according to claim 1, wherein
the first adjustable connection includes a first fastener that attaches the first attachment portion of the connecting member to the band part of the clamp portion, and the first fastener is further arranged to tighten the band part.

11. The bicycle operating device according to claim 10, wherein
the outwardly facing surface is formed on the band part of the clamp portion and is curved, and the first attachment portion of the connecting member has a curved mounting surface that mates with the outwardly facing surface of the band part of the clamp portion such that the outwardly facing surface and the curved mounting surface cooperate together to form at least part of the first adjustable connection.

12. The bicycle operating device according to claim 11, wherein
the second attachment portion of the connecting member includes a slot arranged in a linear direction parallel to the center axis of the clamp portion, and the fastener of the second attachment portion has a shaft disposed in the slot and attached to the second operating unit, the slot and the second fastener cooperating together to further form at least part of the second adjustable connection.

13. The bicycle operating unit connector according to claim 7, wherein
the slot intersects with the recess of the second attachment portion.

14. The bicycle operating unit connector according to claim 1, wherein
the recess opens to at least two distinct surfaces of the second attachment member.

15. The bicycle operating unit connector according to claim 1, wherein
the protruding rib is disposed on the second operating unit at a location spaced from the connecting member with respect to the second direction in at least one attachment position of the second attachment portion.

16. The bicycle operating unit connector according to claim 1, wherein
the protruding rib extends in the second direction for a greater distance than the fastener extends in the second direction.

* * * * *